United States Patent
Kurimoto (10) Patent No.: US 6,623,030 B2
(45) Date of Patent: Sep. 23, 2003

(54) AIRBAG DOOR ASSEMBLY FOR AN INSTRUMENT PANEL AND METHOD OF MAKING THE AIRBAG DOOR ASSEMBLY

(75) Inventor: Takuya Kurimoto, Aichi (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 09/892,260

(22) Filed: Jun. 27, 2001

(65) Prior Publication Data

US 2002/0008368 A1 Jan. 24, 2002

(30) Foreign Application Priority Data

Jun. 27, 2000 (JP) .......................... 2000-192913
May 25, 2001 (JP) .......................... 2001-157301
Apr. 26, 2001 (JP) .......................... 2001-128755

(51) Int. Cl.⁷ ............................................. B60R 21/20
(52) U.S. Cl. .................................. 280/728.3; 280/732
(58) Field of Search ........................... 280/728.3, 731, 280/732

(56) References Cited

U.S. PATENT DOCUMENTS

| 5,044,663 A | * | 9/1991 | Seizert ..................... 280/730.1 |
| 5,082,310 A | * | 1/1992 | Bauer ......................... 280/732 |
| 5,183,289 A | * | 2/1993 | Zeller et al. ............. 280/728.3 |
| 5,275,432 A | * | 1/1994 | Pray et al. ................ 280/728.2 |
| 5,451,075 A | * | 9/1995 | Parker et al. ............. 280/728.3 |
| 5,458,361 A | * | 10/1995 | Gajewski ................. 280/728.3 |
| 5,527,574 A | * | 6/1996 | Iannazzi et al. ............... 428/43 |
| 6,250,669 B1 | * | 6/2001 | Ohmiya ...................... 280/732 |
| 6,378,894 B1 | * | 4/2002 | Trevino et al. .......... 280/728.3 |
| 2003/0011178 A1 | * | 1/2003 | Choi et al. .................. 280/732 |

FOREIGN PATENT DOCUMENTS

| JP | 08267588 A | 10/1996 |
| JP | 10080982 A | 3/1998 |
| JP | 2000025117 A | 1/2000 |
| JP | 2000043567 A | 2/2000 |

* cited by examiner

Primary Examiner—Paul N. Dickson
Assistant Examiner—Laura B. Rosenberg
(74) Attorney, Agent, or Firm—Wood, Phillips, Katz, Clark & Mortimer (57) ABSTRACT

An airbag door assembly consisting of an instrument panel section, a reinforcing assembly, and a lining assembly. The instrument panel section has a core portion with an inside surface and an outside surface. An expanding airbag can project through the core portion of the instrument panel section. The reinforcing assembly is placed against the inside surface of the instrument panel section. At least part of the reinforcing assembly resides between the core portion and the lining assembly. The lining assembly and core portion are vibration joined at at least one location so as to maintain a part of the reinforcing assembly captively between the core portion and the lining assembly.

26 Claims, 6 Drawing Sheets

Fig. 12

AIRBAG DOOR ASSEMBLY FOR AN INSTRUMENT PANEL AND METHOD OF MAKING THE AIRBAG DOOR ASSEMBLY

BACKGROUND OF THE INVENTION

1. Field of the Invention

This invention relates to airbags and, more particularly, to an airbag door assembly which can be incorporated into the instrument panel of a passenger vehicle. The invention is also directed to a method of making the airbag door assembly.

2. Background Art

There is an increasing trend to incorporate airbags at other than the driver's location in a moving vehicle so as to protect passengers. A typical airbag system consists of an expandable airbag encased within a housing that is attached to the back of an instrument panel in front of an occupant's seat. The instrument panel typically has an opening through which the airbag projects as it is expanded upon being deployed. The undeployed airbag within the housing is normally concealed by a door which covers the opening through the instrument panel. Typically, the external surface of the door has an appearance that is matched to the other exposed portions of the instrument panel.

In the event that the vehicle is subjected to a shock, as by that resulting from a collision, the airbag deploys. As the airbag expands, it opens the door over the instrument panel opening and projects therethrough into a deployed state.

Conventionally, the door provided over the instrument panel opening is not integrally formed with the instrument panel. Instead, the door is separately manufactured and joined with the instrument panel. One known process for effecting this combination is known as bi-chromaticforming. Through this process, different resins are used to construct the airbag door and the remainder of the exposed instrument panel.

This conventional structure has some inherent drawbacks. First, by reason of using a separate door element, the door may not visually blend with the remainder of the instrument panel. Thus, the overall appearance of the instrument panel may be compromised. Second, the door and instrument panel may be joined in such a manner that the junction edges may not flushly match. Again, this may detract from the overall appearance of the instrument panel by reason of their being steps or gaps at the points of juncture. Further, the integrity of the connection of the door to the remainder of the instrument panel may not be as good as desired. Still further, the resin materials conventionally used for the instrument panel may not be desirable for use in making the door. Performance requirements for the door may be different than for the instrument panel. Again, this may compromise the appearance of the overall instrument panel.

Figure 1:
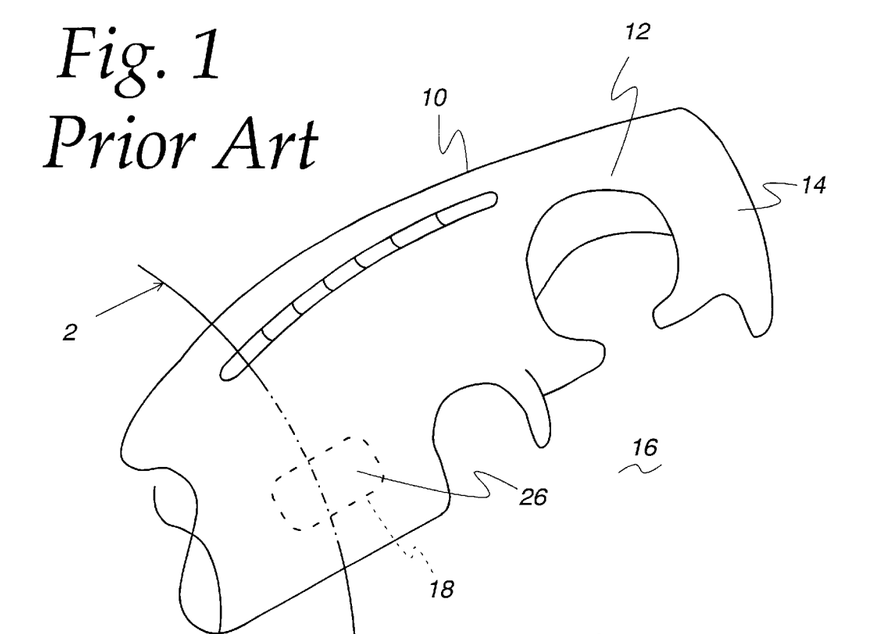
FIG. 1 is a perspective view of an instrument panel having a conventional airbag door assembly incorporated therein.
Figure 2:
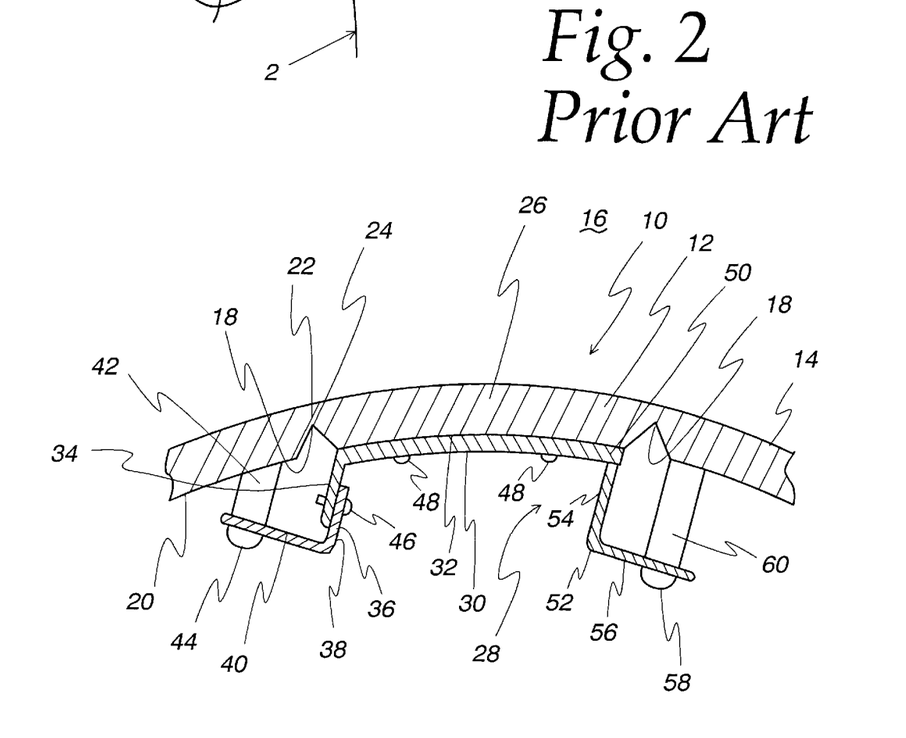
FIG. 2 is an enlarged, cross-sectional view of the instrument panel and airbag door assembly, taken along line 2—2 of FIG. 1.

To address the above problems associated with the separate door and instrument panel, different alternatives have been proposed whereby the external surface of the instrument panel is continuous and uninterrupted at the door region. Such an integral construction is shown in Japanese Unexamined Patent Application Publication No. 10-44910. This structure is shown in FIGS. 1 and 2 herein. More specifically, in those figures, an instrument panel is shown at 10. The instrument panel 10 has a layer 12 with a surface 14 that is exposed to a vehicle compartment 16. The layer 12 has a V-shaped groove 18 through an inside surface 20, facing oppositely to the surface 14, which groove 18 produces a frangible, reduced thickness portion 22 between an apex 24 of the groove 18 and the surface 14. The groove 18 extends continuously in a substantially rectangular pattern to define a "door" 26 for an airbag (not shown) that is deployed by expanding from the inside of the instrument panel 10 so as to project into the compartment 16.

The door 26 is rigidified by a reinforcing assembly at 28. The reinforcing assembly 28 consists of a reinforcing plate 30 which abuts to the back surface 32 of the door 26. The reinforcing plate 30 has a rearwardly bent flange 34 which is connected to one leg 36 of an L-shaped bracket 38. The other leg 40 of the bracket 38 is attached to a boss 42, fixed to and projecting rearwardly from, the layer 12. The leg 40 is connected to the boss 42 through a fastener 44. A threaded fastener 46 secures the bracket leg 36 to the flange 34. Separate threaded fasteners 48 extend through the reinforcing plate 30 and into the layer 12 to maintain the reinforcing plate 30 in place thereon.

The end 50 of the reinforcing plate 30, remote from the flange 34, is captive between the layer 12 and an L-shaped bracket 52. One leg 54 of the bracket 52 abuts to the flange end 50. The other leg 56 of the bracket 52 is secured by a fastener 58 against a boss 60, fixed to and projecting rearwardly from, the layer 12.

With the above construction, the door 26, with the reinforcing plate 30 attached thereto, is securely held in place so that the region around the door 26 is rigidified. With this arrangement, the expanding airbag repositions the door 26 without causing significant deformation or breakage of the remaining part of the instrument panel 10 around the door 26. However, to provide this reinforcement, it is necessary to separately form and attach the bosses 42, 60 on the back side of the layer 12 and to use a series of fasteners 44, 46, 48, 58 to maintain the overall integrity of the structure.

Figure 3:
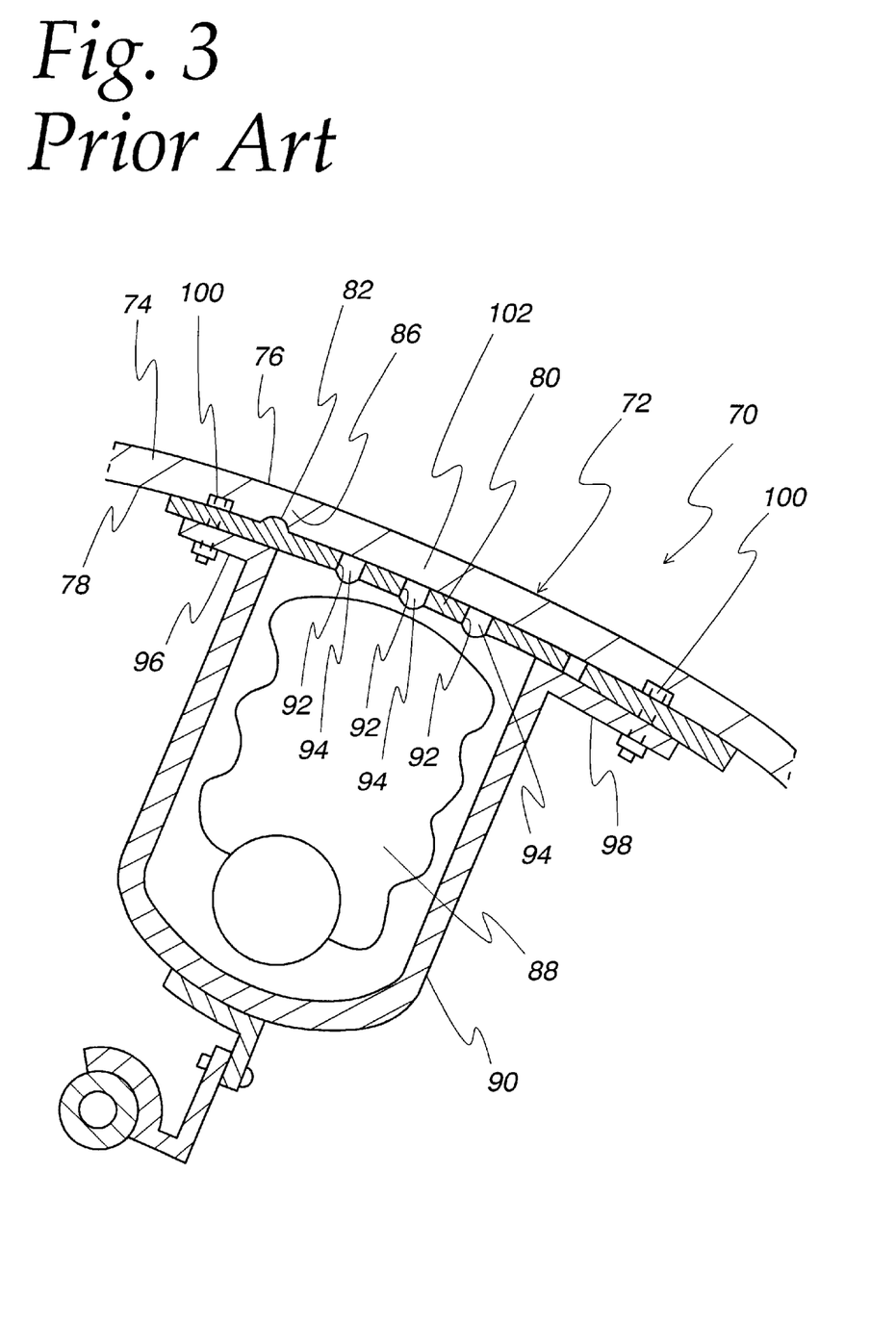
FIG. 3 is a fragmentary, cross-sectional view of an instrument panel with another conventional form of airbag door assembly incorporated therein.

Another conventional airbag deployment system is shown in Japanese Unexamined Patent Application Publication No. 7-291078 and at 70 in FIG. 3 herein. The system 70 consists of an instrument panel 72 with a layer 74 having an exposed, outside surface 76 and an oppositely facing inside surface 78. A reinforcing plate 80 is secured against the inside surface 78 of the layer 74 and has a forward projection 82, which defines a reduced thickness, frangible portion 86 in the layer 74, which ruptures under the force of the expanding airbag 88, which is contained in a cup-shaped, forwardly opening, housing 90.

The reinforcing plate 80 has a series of openings 92 therethrough which accommodate heat deformable bosses 94 projecting rearwardly from the layer 74. The housing 90 has oppositely projecting flanges 96, 98 which are attached to the reinforcing plate 80 through bolts 100.

With this arrangement, a pivotable door 102 is defined. The door 102 itself is rigidified, as is the region of the instrument 72 therearound. Thus, the airbag 88 can be deployed without causing deformation or breakage of the instrument panel 72 around the door 102. At the same time, the outside surface 76 is not interrupted in the region of the door 102, so that a neat, continuous, external surface 76 is provided.

One potential difficulty with the system 70 relates to the selection of the size of the bosses 94. If the bosses 94 are too large, there may be shrinkage of the layer 74. To avoid this shrinkage problem, smaller bosses 94 may be utilized. However, at some point, the integrity of the bosses 94 may be compromised such that upon inflation of the airbag 88, the reinforcing plate 80 separates from the layer 74. The result of this may be damage to the region of the instrument panel 72 around the door 102.

SUMMARY OF THE INVENTION

In one form, the invention is directed to an airbag door assembly consisting of an instrument panel section, a reinforcing assembly, and a lining assembly. The instrument panel section has a core portion with an inside surface and an outside surface. An expanding airbag can project through the core portion of the instrument panel section. The reinforcing assembly is placed against the inside surface of the instrument panel section. At least part of the reinforcing assembly resides between the core portion and the lining assembly. The lining assembly and core portion are vibration joined at at least one location so as to maintain a part of the reinforcing assembly captively between the core portion and the lining assembly.

In one form, the core portion has a weakened portion that facilitates passage through the core portion of an expanding airbag, and the reinforcing assembly has a frame that extends around the weakened portion. The weakened portion may be frangible so as to rupture to facilitate passage of the expanding airbag through the core portion.

The reinforcing assembly may include a section that pivots in response to passage through the core portion of an expanding airbag.

In one form, one of the lining assembly and core portion has at least one part that passes through an opening in the frame assembly and is vibration joined to the other of the lining assembly and core portion.

In one form, the at least one part of the one of the lining assembly and core portion passes through a pivoting section on the reinforcing assembly.

In one form, the at least one part of the one of the lining assembly and core portion consists of a hollow post.

The hollow post may have a cylindrical shape with a peripheral wall with an inside surface surrounding an axis. The hollow post may further have a web spanning two locations on the inside surface of the peripheral wall and extending in a direction generally parallel to the axis of the hollow post.

In one form, an airbag associated with the airbag door assembly expands in a direction along a first line and the web extends generally parallel to the first line.

There may be a plurality of projections on one of the lining assembly and core portion that are vibration joined to the other of the lining assembly and core portion. Each of these projections may be hollow and/or cylindrical in shape.

In one form, the lining assembly and core portion are both made from the same material.

One or both of the lining assembly and core portion may be made from a thermal plastic olefin resin.

In one form, at least one of the projections has a free end with an effective diameter and the other of the lining assembly and core portion has a cavity into which the at least one projection extends. The cavity has an effective diameter that is larger than the effective diameter of the free end of the at least one projection.

In one form, the projection is hollow with an inside surface and an outside surface, with the inside surface diameter being at least 5 mm and the outside surface diameter being at least 20 mm. The inside surface diameter may be at least 10 mm, with the outside surface diameter being at least 30 mm.

The invention is also directed to an airbag door assembly having an instrument panel section and a reinforcing assembly. The instrument panel section has a core portion with an inside surface and an outside surface. An expanding airbag can project through the instrument panel section. A reinforcing assembly is placed on the inside surface of the instrument panel. The reinforcing assembly is maintained on the core portion by vibration joining an element to the core portion.

The element may be an element separate from the core portion and reinforcing assembly.

The invention is further directed to the combination of an airbag, having normal and expanded states, and an airbag door assembly, as previously described.

The invention is further directed to a method of making an airbag door assembly. The method includes the steps of: providing an instrument panel section having a core portion with an inside surface and an outside surface and through which an expanding airbag can project; placing a reinforcing element against the core portion; and through a vibration joining process, joining first and second elements so that the reinforcing element is maintained against the core portion.

The first element may be the core portion.

The second element may be a lining assembly that is initially separate from both the reinforcing element and the core portion.

In one form, the reinforcing element is captive between the core portion and the lining assembly.

DETAILED DESCRIPTION OF THE DRAWINGS

One form of airbag door assembly, according to the present invention, is shown in FIGS. 4–9 at 110. The airbag door assembly 110 consists of an instrument panel section 112 with a core portion that can be defined by one or more layers. In this embodiment, the core portion is defined by a single layer 114 having an exposed, outside surface 116 and an oppositely facing, inside surface 118. The core layer 114 is formed into a desired shaped through injection molding, or the like, from any of a number of different materials, as are known to those skilled in the art. For example, the material can be selected from a filler-containing polypropylene resin made by reinforcing a polypropylene resin with talc, mica, or glass, hereinafter referred to as a "PPC resin", a denatured PPO resin, and an ABS resin.

Figure 4:
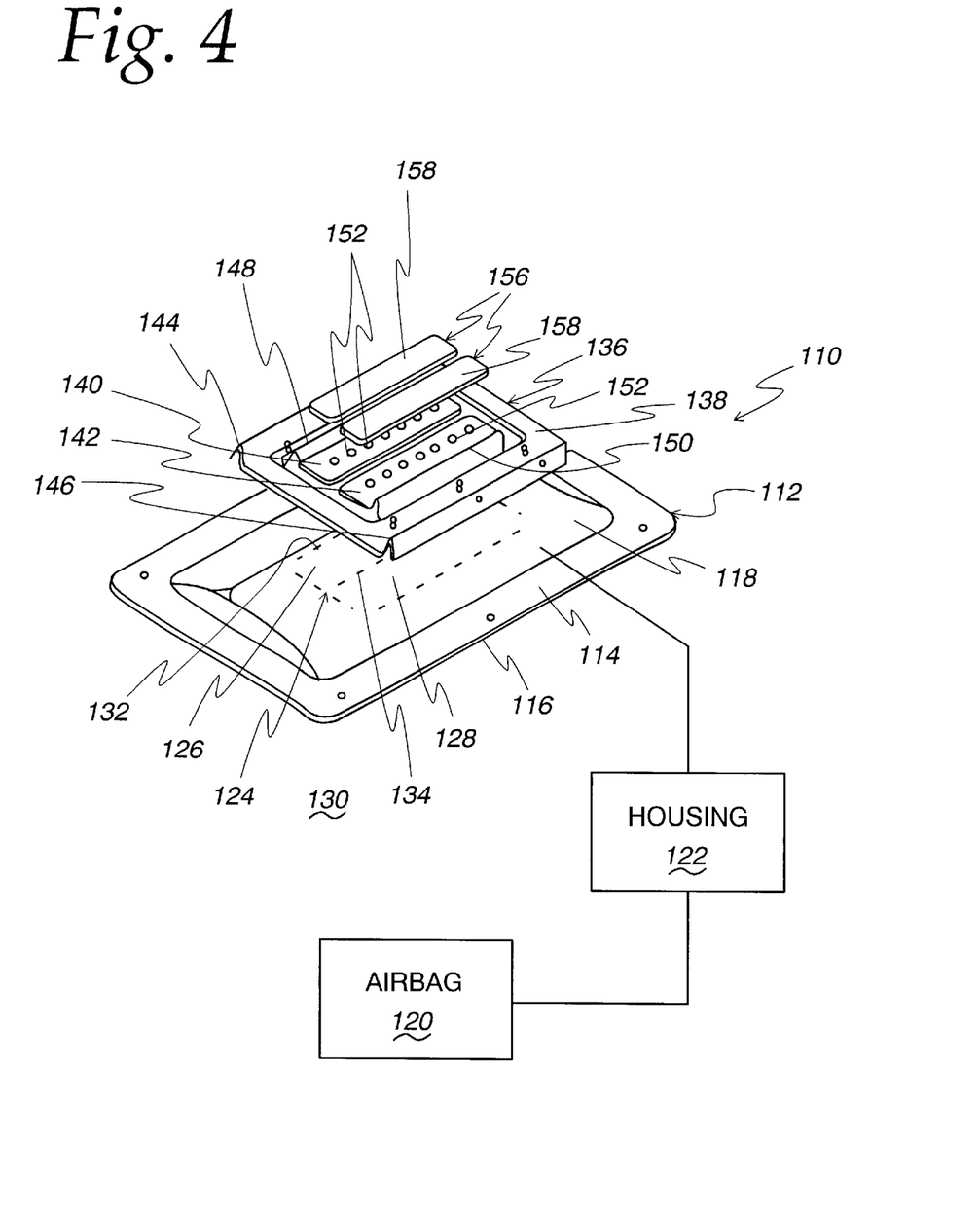
FIG. 4 is an exploded, perspective view of an airbag door assembly, made according to the present invention, and including an instrument panel section and lining assembly between which a reinforcing assembly is captively held.

The airbag door assembly 110 is used in conjunction with an airbag 120 mounted at the inside surface 118 of the core layer through and within a housing 122. The particular form of the housing 122 is not key to the present invention.

The airbag 120 is mounted so that in an undeployed state it resides entirely at the rear of the core layer 114 whereas, upon being deployed, it expands and projects through a door 124, having sections 126, 128, which fold outwardly in response to the expansion pressure of the deployed airbag 120. This allows projection of the airbag 120 through the instrument panel section 112 and into the compartment 130 at the front of the airbag assembly 110.

More particularly, the configuration of the door 124 is determined by a peripheral, weakening line 132 in the desired shape of the door. In this case, the peripheral weakening line 132 bounds a rectangular shape, which is bisected in a lengthwise direction by a weakening line 134. The weakening lines may be formed continuously to provide a localized, reduced thickness so as to produce a frangible portion which ruptures in a predetermined and predictable manner. Any other type of weakening structure, or structure that facilitates forward projection of the door 124, in response to airbag deployment, is contemplated. For example, the weakening can be short, interrupted lines or some other mechanism which may not be in the form of a cut or notch.

The airbag door assembly 110 further includes a reinforcing assembly 136, which is mounted against the inside surface 118 of the core layer 114 for reinforcement of the instrument panel section 112 in the vicinity of the door 124. The reinforcing assembly 136 rigidifies the instrument panel section 112 to reduce the likelihood of deformation or damage thereto as an incident of the airbag 120 deploying. The housing 122 containing the airbag 120 can be mounted either to the reinforcing assembly 136 or directly against the core layer 114. The reinforcing assembly 136 consists of a frame 138, that extends around the weakening line 132 defining the door 124, and frame sections 140, 142 which reside against the sections 126, 128 and are pivotable forwardly under the pressure of the expanding airbag 120 to rupture the core layer 114 at the weakening lines 132, 134, and thereby allow projection of the airbag 120 forwardly into the compartment 130. For purposes of rigidity, the frame 138 is formed to define forwardly opening, V-shaped edges 144, 146 extending along the longer dimension of the frame 138. Similar, V-shaped edges 148, 150 are formed on the sections 140, 142 adjacent to the pivot location and run generally parallel to the edges 144, 146, respectively. Portions of the reinforcing assembly 136, other than at the edges 148, 150, are preferably subjected to bead processing, to impart rigidity thereto.

The reinforcing assembly 136 can be made from sheet metal, which may be steel or aluminum, or a resin such as polycarbonate. In one form, the reinforcing assembly 136 is made from plate material having a thickness on the order of 0.5 mm.

A plurality of openings 152 are provided through both of the frame sections 140, 142. In this case, there are a plurality of such openings 152 at equally spaced locations in a linear arrangement on each section 140, 142.

The edges 148, 150 are so formed to reduce the likelihood of interference between the frame and the airbag 120 as the airbag expands upon being deployed. This contributes to unimpeded inflation of the airbag 120.

The airbag door assembly 110 further includes a lining assembly at 156, in this case consisting of strips 158, each having the same construction and matched nominally to the shape of the pivoting frame sections 140, 142, absent the edges 148, 150. As explained in greater detail below, the lining assembly 156 cooperates with the core layer 114 to captively maintain the reinforcing assembly 136 in an operative position with respect to the instrument panel section 112.

The lining assembly 156 may be made from any of a number of different materials, including resins such as PPC resin, a denatured PPO resin, and an ABS resin. The material may be the same as, or different than, the material defining the core layer 114. Use of the same material may improve the bond between materials, as explained in greater detail below. PPO resin is desirably used for the lining assembly 156. PPO resin absorbs impact and shearing forces and generally has excellent low temperature properties, which make it suitable for use in low temperature environments.

Figure 5:
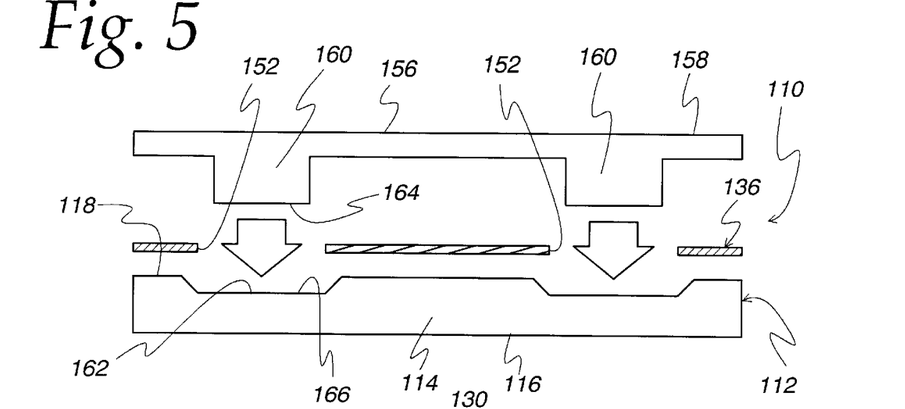
FIG. 5 is an enlarged, exploded, fragmentary, elevation view of the inventive airbag door assembly of FIG. 4.
Figure 6:
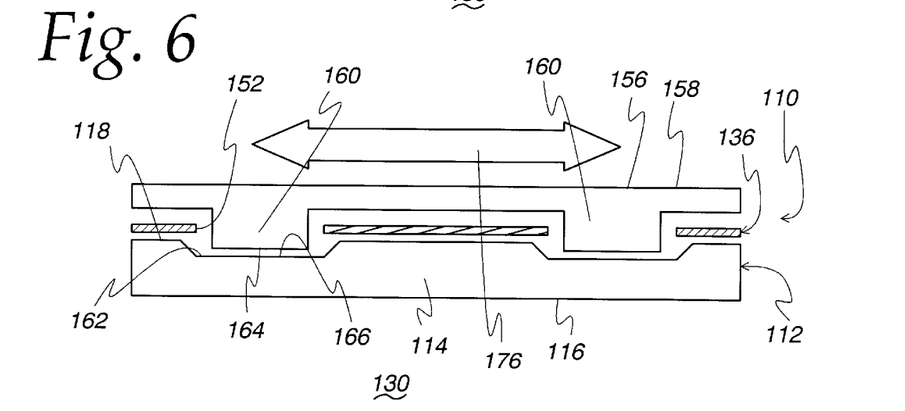
FIG. 6 is a view as in FIG. 5 with the instrument panel section, reinforcing assembly, and lining assembly with projections on the lining assembly moved against the instrument panel to initiate a vibration joining process.

Projections 160 are formed in each lining strip 158 and project toward the inside of the instrument panel section 112. The projections 160 are configured to pass, one each, through the openings 152 formed in the frame sections 140, 142. As shown in FIG. 5, the projections 160 are directed through the openings 152 and into cavities 162 formed in the core layer 114. In a preassembly position shown in FIG. 6, the free end 164 of each of the projections 160 is in close proximity to a surface 166 at the base of each cavity 162.

The projections 160 can have a wide range of different shapes. In one preferred form, each projection 160 has a cylindrical shape. Preferably, the projection 160 is hollow with an outside surface 168 and an inside surface 170. The projections 160 have an exemplary outside diameter of up to 20 mm, and more preferably up to 30 mm. The inside diameter is at least 5 mm, and more preferably, at least 10 mm.

Figures 8, 9:
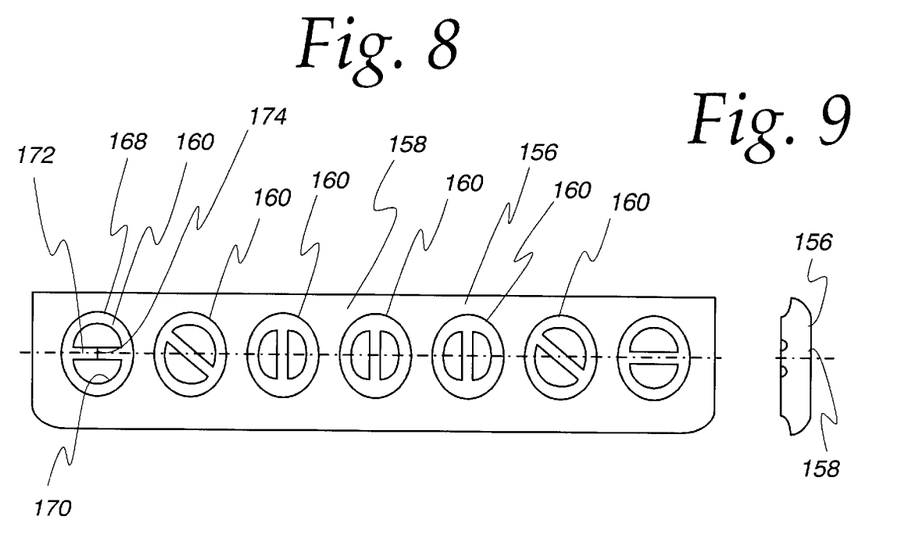
FIG. 8 is a rear, elevation view of the lining assembly in FIGS. 4–7.
FIG. 9 is an end elevation view of the lining assembly in FIG. 8.

Each of the projections 160 has a web 172 having a generally flat shape which spans two locations on the inside surface 170 of the projection 160 Preferably, the web 172 passes through the central axis 174 of each projection 160. The orientation of the web 172 may vary, as shown in FIG. 8. The webs 172 preferably extend over the full extent of each projection parallel to the central axis 174. By reason of this orientation, the webs 172, in conjunction with the remainder of the projections 160, resist the forces exerted by the expanding airbag 120 in a line between the inside and the outside of the instrument panel section, substantially parallel to the cental axes 174 of the projections 160. The webs 172 also distribute expansion forces radially outwardly from the axes 174.

To secure the reinforcing assembly 136 in place, the lining assembly 156, reinforcing assembly 136, and core layer 114 are aligned as shown in FIG. 5. The three elements are then moved towards each other to the preassembly position shown in FIG. 6. In the preassembly position, the lining assembly 156 and core layer 114 are fused together through a vibration joining process that is carried out in a conventional manner. The vibration forces developed in the process are indicated by the double-headed arrow 176 in FIG. 6.

Figure 7:
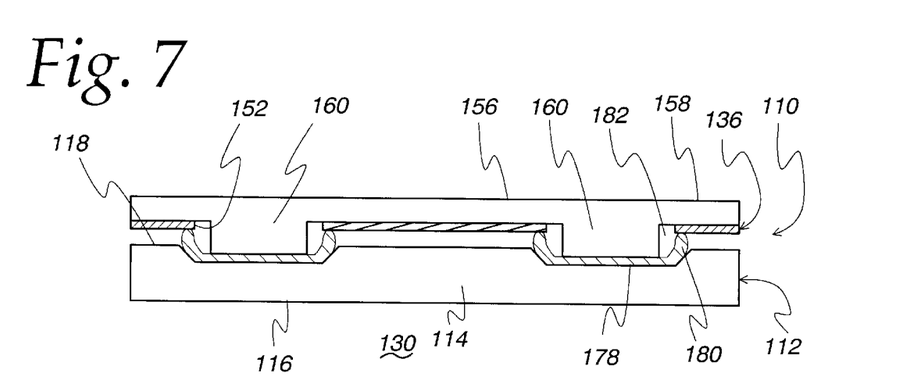
FIG. 7 is a view as in FIG. 6 with the lining assembly and core portion vibration joined.

During the vibration process, the free ends 164 of the projections 160 and the surfaces 166 bounding the base of each cavity 162 side against each other and are heated through friction to the point that the free ends 164 and surfaces 166 melt so that they become fused, as shown in FIG. 7. At the same time, the webs 172 melt and flow radially outwardly.

Because of the hollow construction, shearing forces attributable to the difference in expansion and contraction between the resin material of the projections 160 and the reinforcing material defining the webs 172 in the cold/hot transition periods can be dispersed.

In addition to the reinforcing function provided by the webs 172, the webs 172 provide a source of additional material that is melted to enhance fusion bonding.

As seen in FIG. 7, the melted portions 178, where the projections 160 and cavity surfaces 166 are fused, flow radially outwardly relative to the central axes 174 of the projections 160 to form burrs 180. This condition can be alleviated by making the cavities 162 of a larger diameter relative to the diameter of the projections 160. By doing so, gaps 182 of more substantial dimension than that shown may be formed. The gaps 182, even with burr formation, relieve thermal stresses generated due to expansion differences during the heating and cooling stages of the vibration joining process.

Using this process, the need to use separate fasteners on the core layer 114 may be obviated while producing a strong holding force between the core layer 114 and reinforcing assembly 136. The reinforcing assembly 136 can be positively captively held over a large area by the lining assembly 156

With this arrangement, even when the reinforcing assembly 136 is made from a metal such a steel or aluminum, with a thermal expansion coefficient that is different than that of the core layer 114 and lining assembly 156, the reinforcing assembly 136 is allowed to expand and contract as the environmental temperature changes. This inhibits distortion and breakage due to thermal expansion.

Figure 10:
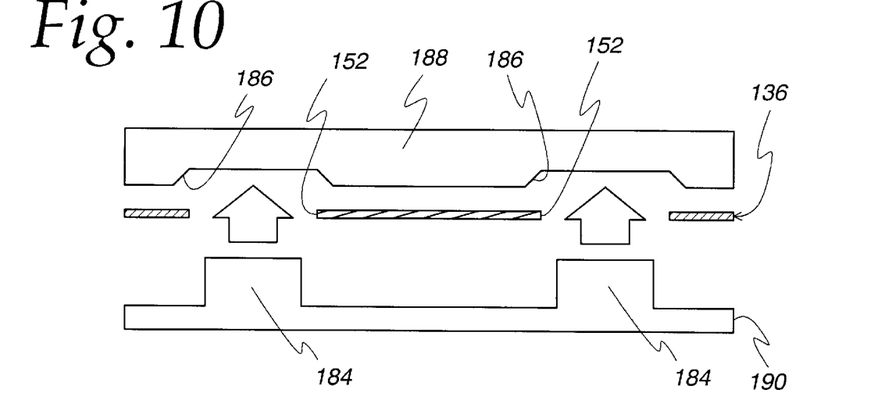
FIGS. 10–12 correspond to FIGS. 5–7, with projections being provided on an instrument panel section to be vibration joined to a lining assembly.
Figure 11:
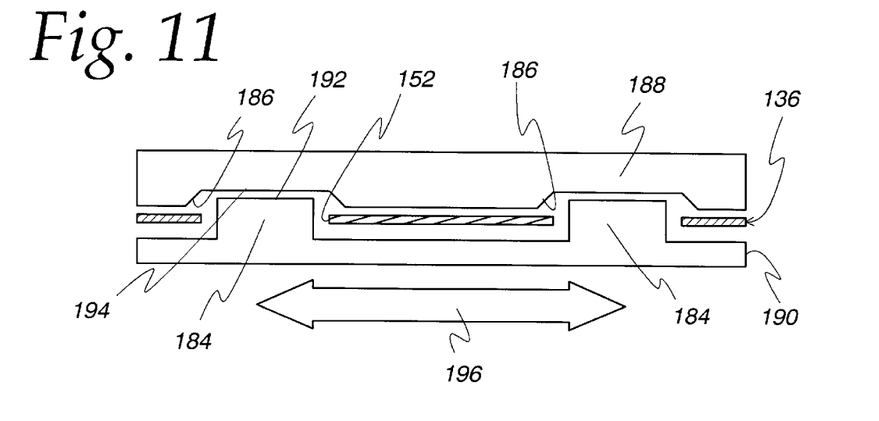
Figure 12:
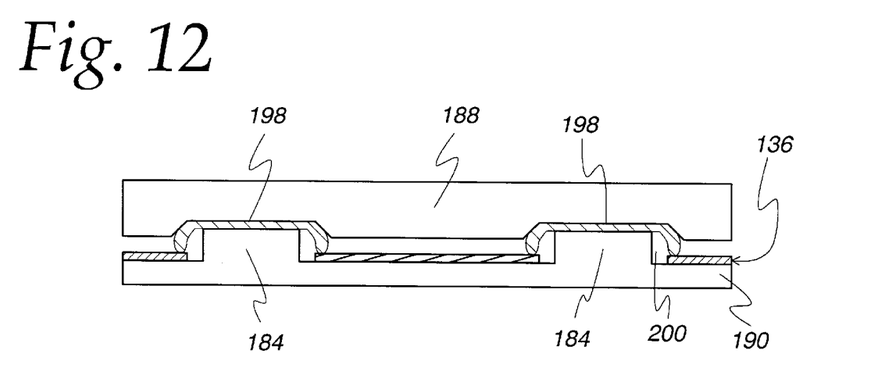

As shown in FIGS. 10–12, projections 184 and cooperating cavities 186, corresponding to the projections and cavities 160, 162, previously described, can be provided on a lining assembly 188 and core layer 190, corresponding to the previously described lining assembly 156 and core layer 114. In other words, the projections 184 and cavities 186 are reversed on the lining assembly 188 and core layer 190 compared to the previously described embodiment.

The assembly process is the same regardless of which element projections and cavities are formed upon. That is, as shown in FIG. 10, the reinforcing assembly 136 is aligned with the lining assembly 188 and core layer 190 so that the projections 184 can extend through the openings 152 and into the cavities 186. In the preassembly position of FIG. 11, the free ends 192 of the projections 184 are in close proximity to a surface 194 at the base of each cavity 186. Thereafter, the vibration process is carried out, with relative movement effected between parts as indicated by the double-headed arrow 196. The fused projections 184 and lining assembly 188 produce a radially distributed melted portion 198. Again, by controlling the relative diameters of the projections 184 and cavities 186, burr formation can be minimized or eliminated, as by producing gaps 200 of substantial dimension.

With the airbag door assembly 110, the outside surface 116 is uninterrupted so that there is no visible indication of the location of the door 124 or airbag 120. At the same time, the vibration joining process may be used to effect a positive fusion between the lining assembly 156 and core layer 114, so that the reinforcing assembly 136 is positively, captively held therebetween. With this arrangement, there is no need to attach separate elements to the core layer 114 as might introduce the possibility of shrinkage that could be detectable at the surface 116.

By reason of using the vibration joining process, flexibility is provided with respect to selection of materials for the core layer 114, lining assembly 156 and reinforcing assembly 136.

The foregoing disclosure of specific embodiments is intended to be illustrative of the broad concepts comprehended by the invention.

What is claimed is:

1. An airbag door assembly comprising:
   an instrument panel section having a core portion with an inside surface and an outside surface and through which an expanding airbag can project by movement in a first direction,
   the outside surface facing in the first direction with the inside surface facing oppositely to the first direction;
   a reinforcing assembly for placement against the inside surface; and
   a lining assembly,
   at least a part of the reinforcing assembly residing between the core portion and the lining assembly,
   the lining assembly and core portion being vibration joined at at least one location so as to maintain the part of the reinforcing assembly captively between the core portion and the lining assembly.

2. The airbag door assembly according to claim 1 wherein the core portion has a weakened portion that facilitates passage through the core portion of an expanding airbag and the reinforcing assembly comprises a frame that extends around the weakened portion.

3. The airbag door assembly according to claim 2 wherein the weakened portion is frangible and ruptures to facilitate passage through the core portion of an expanding airbag.

4. The airbag door assembly according to claim 2 wherein the reinforcing assembly comprises a section that pivots in response to passage through the core portion of an expanding airbag.

5. The airbag door assembly according to claim 1 wherein one of the a) lining assembly and b) core portion has at least one part that passes through an opening in the reinforcing assembly and is vibration joined to the other of the a) lining assembly and b) core portion.

6. The airbag door assembly according to claim 5 wherein the reinforcing assembly comprises a section that pivots in response to passage through the core portion of an expanding airbag and the at least one part of the one of the a) lining assembly and b) core portion passes through the section.

7. The airbag door assembly according to claim 5 wherein the at least one part of the one of the a) lining assembly and b) core portion comprises a hollow post.

8. The airbag door assembly according to claim 1 wherein there are a plurality of projections on one of the a) lining assembly and b) core portion that are vibration joined to the other of the a) lining assembly and b) core portion.

9. The airbag door assembly according to claim 8 wherein the projections are hollow and cylindrical in shape.

10. The airbag door assembly according to claim 1 wherein the lining assembly and core portion are both made from the same material.

11. The airbag door assembly according to claim 1 wherein the lining assembly comprises a thermoplastic olefin resin.

12. The airbag door assembly according to claim 11 wherein the core portion comprises a thermoplastic olefin resin.

13. An airbag door assembly comprising:
   an instrument panel section having a core portion with an inside surface and an outside surface and through which an expanding airbag can project;
   a reinforcing assembly for placement against the inside surface; and a lining assembly, at least a part of the reinforcing assembly residing between the core portion and the lining assembly, the lining assembly and core portion being vibration joined at at least one location so as to maintain the part of the reinforcing assembly captively between the core portion and the lining assembly, wherein one of the a) lining assembly and b) core portion has at least one part that passes through an opening in the frame assembly and is vibration joined to the other of the a) lining assembly and b) core portion, wherein the at least one part of the one of the a) lining assembly and b) core portion comprises a hollow post, wherein the hollow post is cylindrical and has a peripheral wall with an inside surface surrounding an axis and further comprises a web spanning two locations on the inside surface of the peripheral wall and extending in a direction generally parallel to the axis of the hollow post.

14. The airbag door assembly according to claim 13 wherein an airbag associated with the airbag door assembly expands in a direction along a first line and the web extends generally parallel to the first line.

15. An airbag door assembly comprising:

an instrument panel section having a core portion with an inside surface and an outside surface and through which an expanding airbag can project;

a reinforcing assembly for placement against the inside surface; and a lining assembly, at least a part of the reinforcing assembly residing between the core portion and the lining assembly, the lining assembly and core portion being vibration joined at at least one location so as to maintain the part of the reinforcing assembly captively between the core portion and the lining assembly, wherein there are a plurality of projections on one of the a) lining assembly and b) core portion that are vibration joined to the other of the a) lining assembly and b) core portion, wherein the projections are hollow and cylindrical in shape, wherein the projections each have a peripheral wall with an inside surface surrounding an axis and further comprise a web spanning two locations on the inside surface of the peripheral wall.

16. The airbag door assembly according to claim 15 wherein the webs are substantially flat and extend substantially parallel to the axes of the projections.

17. An airbag door assembly comprising:

an instrument panel section having a core portion with an inside surface and an outside surface and through which an expanding airbag can project;

a reinforcing assembly for placement against the inside surface; and a lining assembly, at least a part of the reinforcing assembly residing between the core portion and the lining assembly, the lining assembly and core portion being vibration joined at at least one location so as to maintain the part of the reinforcing assembly captively between the core portion and the lining assembly, wherein there are a plurality of projections on one of the a) lining assembly and b) core portion that are vibration joined to the other of the a) lining assembly and b) core portion, wherein at least one of the projections has a free end with an effective diameter and the other of the lining assembly and core portion has a cavity into which the at least one projection extends, and the cavity has an effective diameter that is larger than the effective diameter of the free end of the at least one projection.

18. The airbag door assembly according to claim 17 wherein the at least one projection is hollow and has an inside surface with a diameter and an outside surface with a diameter, the inside surface diameter is at least 5 mm and the outside surface diameter is at least 20 mm.

19. The airbag door assembly according to claim 18 wherein the inside surface diameter is at least 10 mm and the outside surface diameter is at least 30 mm.

20. In combination:

a) an airbag having normal and expanded states; and b) an airbag door assembly comprising:

an instrument panel section having a core portion with an inside surface and an outside surface and through which the airbag projects as the airbag changes from the normal state into the expanded state; and a reinforcing assembly for placement against the inside surface, wherein the reinforcing assembly is maintained on the core portion by vibration joining a first element to the core portion, wherein the first element is an element separate from the core portion and reinforcing assembly, wherein the reinforcing element is captive between the core portion and the first element.

21. The combination according to claim 20 wherein the core portion has a weakened portion that facilitates passage through the core portion of an expanding airbag and the reinforcing assembly comprises a frame that extends around the weakened portion.

22. The combination according to claim 21 wherein the weakened portion is frangible and ruptures to facilitate passage through the core portion of an expanding airbag.

23. The combination according to claim 22 wherein the reinforcing assembly comprises a section that pivots in response to passage through the core portion of an expanding airbag.

24. A method of making an airbag door assembly, the method comprising the steps of:

providing an instrument panel having a core portion with an inside surface and an outside surface and through which an expanding airbag can project;

placing a reinforcing element against the core portion; and through a vibration process, joining first and second elements so that the reinforcing element is maintained on the core portion, wherein the first element is the core portion, wherein the second element is a lining assembly that is initially separate from both the reinforcing element and the core portion, wherein the reinforcing element is captive between the core portion and the lining assembly.

25. The method of making an airbag door assembly according to claim 24 wherein the core portion has a weakened portion that facilitates passage through the core portion of an expanding airbag and the reinforcing assembly comprises a frame that extends around the weakened portion.

26. The method of making airbag door assembly according to claim 25 wherein the weakened portion is frangible and ruptures to facilitate passage through the core portion of an expanding airbag.

* * * * *